United States Patent [19]
Yatake

[11] Patent Number: 6,132,502
[45] Date of Patent: *Oct. 17, 2000

[54] PIGMENT-BASE INK COMPOSITION CAPABLE OF FORMING IMAGES EXCELLENT IN RESISTANCE TO SCUFFING

[75] Inventor: Masahiro Yatake, Suwa, Japan

[73] Assignee: Seiko Epson Corporation, Tokyo-To, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/113,943

[22] Filed: Jul. 10, 1998

Related U.S. Application Data

[63] Continuation-in-part of application No. PCT/JP97/04143, Nov. 13, 1997.

[30] Foreign Application Priority Data

Nov. 13, 1996 [JP] Japan ................................ 7-302228

[51] Int. Cl.[7] .................................................. C09D 11/02
[52] U.S. Cl. ..................................... 106/31.86; 106/31.89
[58] Field of Search ............................... 106/31.86, 31.6, 106/31.89

[56] References Cited

U.S. PATENT DOCUMENTS

| | | | |
|---|---|---|---|
| 2,083,372 | 6/1937 | Guthmann | 134/29 |
| 3,291,580 | 12/1966 | Malick | 44/53 |
| 5,156,675 | 10/1992 | Breton et al. | 106/31.86 |
| 5,183,502 | 2/1993 | Meichsner et al. | 106/31.58 |
| 5,196,056 | 3/1993 | Prasad | 106/31.58 |
| 5,320,668 | 6/1994 | Shields et al. | 106/20 R |
| 5,376,169 | 12/1994 | Hotomi et al. | 106/31.73 |
| 5,746,818 | 5/1998 | Yatake | 106/31.86 |

FOREIGN PATENT DOCUMENTS

| | | |
|---|---|---|
| 0761783 | 3/1997 | European Pat. Off. . |
| 56147861 | 11/1981 | Japan . |
| 56157468 | 12/1981 | Japan . |
| 58002364 | 1/1983 | Japan . |
| 5295310 | 11/1993 | Japan . |
| 5339516 | 12/1993 | Japan . |
| 625572 | 2/1994 | Japan . |
| 7109431 | 4/1995 | Japan . |
| 83498 | 1/1996 | Japan . |
| 867840 | 3/1996 | Japan . |
| 8283635 | 10/1996 | Japan . |
| 8100028 | 1/1981 | WIPO . |

OTHER PUBLICATIONS

Patent Abstracts of Japan of JP 56–147861 of Nov. 1981.
Patent Abstracts of Japan of JP 56–157468 of Dec. 1981.
Patent Abstracts of Japan of JP 58–2364 of Jan. 1983.

*Primary Examiner*—Helene Klemanski
*Attorney, Agent, or Firm*—Ladas & Parry

[57] ABSTRACT

An ink jet recording ink is disclosed which can realize feathering- or bleeding-free, waterfast recording on plain paper, recycled paper, and recording media having a surface gloss layer. The ink composition comprises a pigment, a glycol ether, a water-soluble emulsion, and water, the pigment being dispersible and/or soluble in water without a dispersant, the glycol ether being one member or a mixture of at least two members selected from a group consisting of diethylene glycol mono-n-butyl ether, triethylene glycol mono-n-butyl ether, propylene glycol mono-n-butyl ether, and dipropylene glycol mono-n-butyl ether.

19 Claims, No Drawings

PIGMENT-BASE INK COMPOSITION CAPABLE OF FORMING IMAGES EXCELLENT IN RESISTANCE TO SCUFFING

This is a continuation-in-part of copending application Ser. No. PCT/JP97/04143 filed on Nov. 13, 1997, claims the benefit thereof and incorporates the same by reference.

BACKGROUND OF THE INVENTION

1. Field of the Invention

The present invention relates to an ink jet recording ink which can yield a high-quality print having no significant feathering or bleeding on plain papers, recycled papers, or coated papers.

2. Background Art

Ink jet recording is a method wherein an ink is ejected as a droplet through fine nozzles to record letters or figures onto the surface of a recording medium. Ink jet recording systems which have been put to practical use include: a method wherein an electrical signal is converted to a mechanical signal using an electrostrictive strain to intermittently eject an ink reservoired in a nozzle head section, thereby recording letters or symbols on the surface of a recording medium and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Properties required of inks used in the ink jet recording are such that the drying property of the print is good, no feathering is created, printing can be homogeneously performed on the surface of various recording medium, and, in the case of multi-color printing, color-to-color intermixing does not occur, and the printed image possesses excellent waterfastness and rubbing/scratch resistance.

In order to overcome these requirements, various ink compositions have been proposed in the art.

For example, Japanese Patent Publication 2907/1990 proposes utilization of glycol ether as a wetting agent, Japanese Patent Publication 15542/1989 proposes utilization of a water-soluble organic solvent, and Japanese Patent Publication 3837/1990 proposes utilization of a dye solubilizer.

Further, in order to improve the penetrability of the ink, U.S. Pat. No. 5,156,675 proposes addition of diethylene glycol monobutyl ether, U.S. Pat. No. 5,183,502 proposes addition of Surfynol 465, an acetylene glycol surfactant, and U.S. Pat. No. 5,196,056 discloses addition of both diethylene glycol monobutyl ether and Surfynol 465. In this connection, diethylene glycol mono-n-butyl ether is known also as butylcarbitol and described, for example, in U.S. Pat. No. 3,291,580. Further, utilization of an ether of diethylene glycol has been studied in U.S. Pat. No. 2,083,372. Furthermore, Japanese Patent Laid-Open No. 147861/1981 proposes use of a pigment and triethylene glycol monomethyl ether in combination.

In the ink composition using a pigment, an attempt to suppress penetration of the ink in the surface of a recording medium has been made to ensure the print quality.

In some cases, however, when the ink composition does not penetrate into the recording medium to a certain extent, the pigment is left on the surface of the recording medium, deteriorating the rubbing/scratch resistance of the print. Further, in recent years, a recording medium has been utilized wherein a surface gloss layer is provided, a gloss is put on the recorded image and added value is imparted to the image. A pigment-type ink capable of realizing an image having good rubbing/scratch resistance on the recording medium has been desired in the art.

SUMMARY OF THE INVENTION

The present inventors have now found that an ink composition comprising a combination of a specific pigment with a glycol and a water-soluble emulsion can effectively suppress feathering or bleeding and can realize a high-quality image possessing excellent waterfastness and rubbing/scratch resistance. The present invention has been made based on such finding.

Accordingly, an object of the present invention is to provide an ink composition which can realize a good image suffering from no significant feathering or bleeding and possessing excellent waterfastness and rubbing/scratch resistance on plain paper and recycled paper, as well as on recording media having a surface gloss layer.

According to the present invention, there is provided an ink composition comprising at least a pigment, a glycol ether, a water-soluble emulsion, and water, the pigment being dispersible and/or soluble in water without a dispersant, the glycol ether being one member or a mixture of at least two members selected from among diethylene glycol mono-n-butyl ether, triethylene glycol mono-n-butyl ether, propylene glycol mono-n-butyl ether, and dipropylene glycol mono-n-butyl ether.

DETAILED DESCRIPTION OF THE INVENTION

Ink Composition

The ink composition of the present invention may be used in recording systems using an ink composition. Recording systems using an ink composition include, for example, an ink jet recording system, a recording system using a writing implement, such as a pen, and other various printing systems. In particular, the ink composition of the present invention is preferably used in ink jet recording.

The ink composition of the present invention comprise at least a pigment, a glycol ether, a water-soluble emulsion, and water, the pigment being dispersible and/or soluble in water without a dispersant. The ink composition according to the present invention can realize an image suffering from no significant feathering or bleeding possessing good waterfastness and rubbing/scratch resistance.

A preferred pigment used in the present invention is one which has been subjected to surface treatment so that at least one functional group, selected from carbonyl, carboxyl, hydroxyl, and sulfone groups, or a salt thereof is bonded to the surface of the pigment, thereby permitting the pigment to be dispersible and/or soluble in water without a dispersant. This pigment can be prepared by grafting a functional group or a molecule containing a functional group onto the surface of carbon black by physical treatment, such as vacuum plasma, or chemical treatment. In the present invention, a single type or a plurality of types of functional groups may be grafted onto one carbon black particle. The type of the functional group to be grafted and the degree of grafting may be suitably determined by taking the dispersion stability in the ink, the color density, the drying property at the front face of the ink jet head and the like into consideration.

In the present invention, when the pigment is stably present in water without any dispersant, this state is expressed as the state of "dispersion and/or dissolution." It is difficult to clearly distinguish the state of dissolution of a material from the state of dispersion of the material. In the present invention, any pigment can be used so far as the pigment is stably present in water without any dispersant independently of whether the pigment is in a dispersion form or a solution form. In the present specification, a pigment, which can stably exist in water without any dispersant is often referred to as a "water-soluble pigment." The water-soluble pigment in this case, however, does not exclude a pigment which is in the state of dispersion in water.

According to a preferred embodiment of the present invention, the pigment is used as a pigment dispersion having an average particle diameter of 10 to 300 nm and a degree of dispersion of not more than 10.

The pigment, which is preferably used in the present invention, may be prepared, for example, by a method disclosed in Japanese Patent Laid-Open No. 3498/1996.

The amount of the pigment added to the ink composition is preferably 2 to 15% by weight, more preferably about 4 to 10% by weight.

In the present invention, preferably, the glycol ether refers to one member or a mixture of at least two members selected from among diethylene glycol mono-n-butyl ether, triethylene glycol mono-n-butyl ether, propylene glycol mono-n-butyl ether, and dipropylene glycol mono-n-butyl ether.

In general, in a pigment-type ink composition, the pigment is dispersed with the aid of a dispersant. An experiment conducted by the present inventors has revealed that addition of a glycol ether to the pigment-type ink containing the dispersant in order to improve the penetration of an ink breaks stable dispersion and causes agglomeration and thickening.

The amount of the glycol ether added to the ink composition according to the present invention is preferably about 3 to 30% by weight, more preferably about 5 to 10% by weight.

The ink composition according to the present invention comprises a water-soluble emulsion. Preferably, the water-soluble emulsion comprises a continuous phase of water and a dispersed phase of acrylic resin, methacrylic resin, styrene resin, urethane resin, acrylamide resin, epoxy resin, or a mixture of these resins. The resin is not limited by copolymerization methods and may be, for example, a block copolymer, a random copolymer or the like. Further, preferably, the water-soluble emulsion used in the ink composition of the present invention has a film forming property and has a lowest possible film forming temperature of preferably room temperature or below. According to a preferred embodiment of the present invention, the polarity of the water-soluble emulsion is identical to the polarity of the surface of the pigment. Specifically, when the surface of the pigment is anionic, the water-soluble emulsion is preferably anionic. On the other hand, when the surface of the pigment is cationic, use of a cationic, water-soluble emulsion is preferred. The water-soluble emulsion may comprise a core surrounded by a shell. The core/shell type dispersion is preferred from the viewpoint of stability in the ink.

Examples of a monomer for the core portion of the emulsions include: styrene, tetrahydrofurfuryl acrylate, butyl methacrylate, ($\alpha$, 2, 3 or 4)-alkylstyrenes, ($\alpha$, 2, 3 or 4)-alkoxystyrenes, 3,4-dimethylstyrene, $\alpha$-phenylstyrene, divinylbenzene, vinylnaphthalene, dimethylamino (meth)acrylate, dimethylaminoethyl (meth)acrylate, dmethylaminopropyl acrylamide, N,N-dimethyl acrylamide, N-isopropyl acrylamide, N,N-diethyl acrylamide, methyl (meth)acrylate, ethyl (meth)acrylate, propyl (meth)acrylate, ethyl-hexyl (meth)acrylate, the other alkyl (meth)acrylates, methoxy-diethylene glycol (meth)acrylate, ethoxy-, propoxy- or butoxy-diethylene glycol or polyethylene glycol (meth)acrylates, cyclohexyl (meth)acrylate, benzyl (meth)acrylate, phenoxyethyl (meth)acrylate, isobornyl (meth)acrylate, hydroxyalkyl (meth)acrylates, fluorine-, chlorine- or silicon-containing (meth)acrylates, (meth)acrylamide, maleic acid amide, and (meth)acrylic acid.

In order to introduce a crosslinking structures, in addition to the above monomer, (mono-, di-, tri-, tetra- or poly-) ethylene glycol di(meth)acrylates, 1,4-butanediol, 1,5-pentanediol, 1,6-hexanediol, 1,8-octanediol, 1,10-decanediol (meth)acrylates, trimethylolpropane tri(meth)acrylate, glycerine (di-, tri-)(meth)acrylates, bisphenol A or F ethylene oxide di(meth)acrylate, neopentyl glycol di(meth)acrylate, pentaerythritol tetra(meth)acrylate, and dipentaerythritol decanediol (meth)acrylates, trimethylolpropane tri(meth)acrylate, glycerine (di-, tri-)(meth)acrylates, bisphenol A or F ethylene oxide di(meth)acrylate, neopentyl glycol di(meth)acrylate, pentaerythritol tetra(meth)acrylate, and dipentaerythritol hexa(meth)acrylate may be added.

Furthermore, such core-forming materials can be used also in the formation of the shell portion.

As the emulsifier used for forming such finely divided polymer particles, conventional one such as anionic, non-ionic and amphoteric surface active agents in addition to sodium lauryl sulfate and potassium lauryl sulfate can be used.

As the polymerization initiator, in addition to potassium persulfate and ammonium persulfate, hydrogen peroxide, azobisisobutyronitrile, benzoyl peroxide, dibutyl peroxide, peracetic acid, cumene hydroperoxide, t-butyl hydroxyperoxide, and paramenthane hydroxyperoxide can be used.

As the chain transfer agent for polymerization, in addition to t-dodecyl mercaptane, n-dodecyl mercaptane, n-octyl mercaptane, xanthogens such as dimethylxanthogen disulfide or diisobutylxanthogen disulfide as well as dipentene, indene, 1,4-cyclohexadiene, and dihydrofuran, xanthene can be used.

The amount of the water-soluble emulsion added may be properly determined. For example, it is preferably about 0.5 to 5% by weight, more preferably about 10 to 30% by weight.

The ink composition may contain, in addition to the above ingredients, other ingredients. Examples of other ingredients usable herein include, for example, nozzle clogging preventives, preservatives, antioxidants, electric conductivity adjustors, pH adjustors, viscosity modifiers, surface tension modifiers, and oxygen absorbers.

Water-soluble glycols may be added to the ink composition of the present invention from the viewpoint of preventing the ink composition from drying at the front face of the nozzle. Examples of water-soluble glycols usable herein include ethylene glycol, diethylene glycol, triethylene glycol, tetraethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, glycerine, mesoerythritol, and pentaerythritol.

According to a preferred embodiment of the present invention, the ink composition of the present invention contains an acetylene glycol surfactant. Examples of acetylene glycol surfactants usable herein include 2,4,7,9-tetramethyl-5-decyn-4,7-diol, 3,6-dimethyl-4-octyne-3,6-diol, and 3,5-dimethyl-1-hexyn-3-ol, for example, Surfynol 104, 82, 465, 485, and TG, all of which are commercially available from Nissin Chemical Industry Co., Ltd. In particular, use of Surfynol 104 or TG can offer good record quality.

The amount of the acetylene glycol surfactant added is preferably about 0.1 to 5% by weight, more preferably about 0.5 to 1.5% by weight, based on the ink composition. Addition of the acetylene glycol surfactant in an amount falling within the above range can realize a further reduction in feathering or bleeding.

Some of the acetylene glycol surfactants, for example, Surfynol 104 and TG, have low HLB and hence have low water solubility. This solubility can be improved by adding additives, such as a glycol ether, a glycol compound, or a surfactant, to the ink composition.

Saccharides may be added to the ink composition of the present invention from the viewpoint of preventing the ink from drying at the front face of the nozzle. Saccharides usable for this purpose include monosaccharides and polysaccharides. Examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount of the saccharide added is preferably about 0.05 to 30% by weight. In the case of glucose, mannose, fructose, ribose, xylose, arabinose, lactose, galactose, aldonic acid, glucitose, maltose, cellobiose, sucrose, trehalose, and maltotriose, the amount thereof is more preferably 3 to 20% by weight. Alginic acid and salts thereof, cyclodextrins, and celluloses, when added in some amount, are likely to increase the viscosity of the ink, and, hence, the amount thereof is preferably small.

Further, according to a preferred embodiment of the present invention, additives may be added which are compatible with water, can improve the solubility of the glycol ether and other ingredients of the ink having low solubility in water, can improve the penetration of the ink into recording media, for example, paper, or can prevent nozzle clogging. Examples of such additives include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; formamide; acetamide; dimethyl sulfoxide; sorbit; sorbitan; acetin; diacetin; triacetin; and sulfolane. The amount of these additives added is preferably about 5 to 60% by weight based on the total amount of the ink composition.

Further, other surfactants may be added to the ink composition of the present invention from the viewpoint of regulating the penetration of the ink. Preferred surfactants which may be added to the ink composition are those having good compatibility with other ingredients of the ink composition, and among others, surfactants having high penetration and stability are preferred. Examples thereof include amphoteric surfactants and nonionic surfactants. Examples of amphoteric surfactants usable herein include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives. Examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids.

Preservatives and fungicides usable herein include, for example, sodium benzoate, pentachlorophenol sodium, 2-pyridinethiol-l-oxide sodium, sodium sorbate, sodium dehydroacetate, 1,2-dibenzothiazolin-3-one (Proxel CRL, Proxel BDN, Proxel GXL, Proxel XL-2, and Proxel TN, manufactured by ICI).

pH adjustors, solubilizers, and antioxidants usable herein include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanate compounds, such as allophanate and methyl allophanate; biuret compounds, such as biuret, dimethylbiuret, and tetramethylbiuret; and L-ascorbic acid and salts thereof. Further, commercially available antioxidants and ultraviolet absorbers are also available. Examples thereof include Tinuvin 328, 900, 1130, 384, 292, 123, 144, 622, 770, and 292, Irgacor 252 and 153, and Irganox 1010, 1076, 1035, and MD1024, manufactured by Ciba-Geigy. It is also possible to use lanthanide oxides.

Viscosity modifiers usable herein include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic, and starch.

Recording Method

Preferably, the ink composition of the present invention is used to yield an image by ink jet recording.

The ink composition according to the present invention can yield a good image even on recording media which have been considered to be likely to cause feathering or bleeding, such as plain paper and recycled paper. Further, an image having excellent rubbing/scratch resistance can be realized also on recording media having a surface gloss layer.

In the present invention, the recording medium having a surface gloss layer refers to, for example, a recording medium comprising a white pigment immobilized onto a substrate with the aid of a binder. Examples thereof include: pictorico recording media prepared by coating ceramic fine particles or colloidal particles of colloidal silica, amorphous silica, colloidal alumina, boehmite, pseudo-boehmite, alumina, aluminum hydroxide, precipitated calcium carbonate, calcium bicarbonate, calcium sulfate, kaolin, talc, barium sulfate, rutile, zinc oxide, zinc sulfide, zinc carbonate, aluminum silicate, diatomaceous earth, calcium silicate, magnesium silicate, zeolite, halloysite, magnesium carbonate, magnesium hydroxide or the like onto a cast coated paper by a special method; and swelling type recording media prepared by coating a resin layer of a polymer or a copolymer of a starch derivative, carboxymethyl cellulose (CMC), hydroxyethyl cellulose (HEC), casein, gelatin, polyvinyl alcohol, polyvinyl pyrrolidone, melamine resin, urea resin, urethane resin, unsaturated polyester resin, maleic anhydride resin, styrene-butadiene resin, an acrylic acid derivative, a methacrylic acid derivative or the like onto a substrate, the recording media being swollen with an ink. Calendering, casting, pressure contact drying using a heated specular surface wetted with an oil, and coating of a glossy resin may be used for creating gloss. For these recording media having a gloss layer, the fixation of the pigment is often deteriorated when surface voids have a certain size. The ink composition of the present invention can realize an image having excellent rubbing/scratch resistance independently of the surface state of the recording media.

The ink composition of the present invention may be used in combination with other ink composition(s) to yield a color image. According to a preferred embodiment of the present invention, the ink composition of the present invention is a black ink and used in combination with other ink composition(s) as a color ink (for example, a yellow ink, a magenta ink, and a cyan ink). In particular, addition of the above water-soluble emulsion also to other ink composition (s) can realize an image having excellent rubbing/scratch resistance. Further, it is also possible to use a method wherein a yellow ink, a magenta ink, and a cyan ink are overprinted to form a black image and this printing is used in combination with the printing of the black ink of the present invention. Printing methods usable herein include one wherein both images are superimposed on top of the other and one wherein these images are alternately formed. In the latter method, areas, having a certain width, of these images may be alternately arranged, or alternatively, lines of both ink compositions may be formed and arranged.

An ink having a relatively high content of a solid, such as a pigment, like the ink composition of the present invention, when placed in a nozzle without ejection for a long period of time, is likely to dry at the front face of the nozzle to cause thickening, leading to an ink droplet trajectory directionality problem. In this case, slightly moving the ink with care not to cause the ink to be delivered from the front face of the nozzle can stir the ink, permitting the ink to be stably ejected. This can be achieved by pressurizing the ink, by means of pressurizing means for ejecting the ink, with care not to cause the ink to be ejected. In the above regulation, use of an electrostrictive element as the pressurizing means is preferred from the viewpoint of easy regulation. Utilization of this mechanism can increase the content of the pigment in the ink, permitting a high color density to be provided using a pigment type ink and, in addition, the ink to be stably ejected.

When the above slight moving of the ink is carried out in the nozzle face of an ink jet recording apparatus, this operation is effective for an ink composition having a pigment content of about 5 to 15% by weight, more preferably about 7 to 10% by weight.

In use, the ink composition of the present invention may be filled into an ink tank constructed so that a polyurethane foam is provided therein and the ink comes into contact with the polyurethane foam. In this case, the glycol ether compound, which is preferably used in the present invention, and the acetylene glycol surfactant used in the present invention are adsorbed onto the polyurethane foam. Therefore, preferably, they are added in an excessive amount in consideration of the adsorption. Further, the polyurethane foam can ensure a negative pressure by using the ink composition of the present invention and is less likely to be decomposed by ingredients of the ink used in the present invention, or to create a deposit causative of clogging of the nozzle. A polyurethane foam not using a curing catalyst containing a metal salt or a cationic material is preferred. Specifically, use of a polyurethane foam comprising a polyfunctional isocyanate, such as tolylene diisocyanate or m-xylene diisocyanate, and a material having a plurality of hydroxyl groups, such as a glycol compound having an average molecular weight of about 300 to 3000, such as polypropylene glycol or polyethylene glycol, glycerin, pentaerythritol, dipentaerythritol, neopentyl glycol, propylene glycol, 1,3-butanediol, 1,4-butanediol, or 1,5-pentanediol, is preferred from the viewpoint of ensuring negative pressure, by virtue of the stability of foam shape, and chemical stability.

EXAMPLES

The present invention will be described in more detail with reference to the following examples, though it is not limited to these examples only.

Ink compositions having the following formulations were prepared.

Emulsions A–D used in the following Examples were prepared as follows.

Emulsion A

In reactor equipped with a dropping funnel, a thermometer, a water cooling reflux conderser and a stirrer, 100 parts of ion-exchanged water was charged, and 0.2 part of potassium persulfate as a polymerization initiator was added with stirring under nitrogen atmosphere at 70° C. A monomer solution of 0.05 part of sodium lauryl sulfate, 5 parts of styrene, 6 parts of tetrahydrofurfuryl acrylate, 5 parts of butyl methacrylate and 0.02 part of t-dodecyl mercaptane in 7 parts of ion-exchanged water was added dropwise at 70° C. to start the reaction for preparing a primary product. Two parts of a 10% ammonium persulfate solution was added to the primary product, followed by a reaction solution comprising 30 parts of ion-exchanged water, 0.2 part of potassium lauryl sulfate, 30 parts of styrene, 15 parts of butyl methacrylate, 16 parts of butyl acrylate, 2 parts of acrylic acid, 1 part of 1,6-hexanediol dimethacrylate, and 0.5 part of t-dodecyl mercaptane with stirring at 70° C. to polymerize the mixture. The reaction solution was then neutralized with ammonia to pH 8–8.5 and passed through a filter having a 0.3 μm mesh to give a filtrate of a aqueous finely divided polymer particle solution as Emulsion A.

Emulsion B

In reactor equipped with a dropping funnel, a thermometer, a water cooling reflux conderser and a stirrer, 100 parts of ion-exchanged water was charged, and 0.2 part of potassium persulfate as a polymerization initiator was added with stirring under nitrogen atmosphere at 70° C. A monomer solution of 0.05 part of sodium lauryl sulfate, 10 parts of styrene, 10 parts of butyl methacrylate and 0.02 part of t-dodecyl mercaptane in 7 parts of ion-exchanged water was added dropwise at 70° C. to start the reaction for preparing a primary product. Two parts of a 10% ammonium persulfate solution was added to the primary product, followed by a reaction solution comprising 30 parts of ion-exchanged water, 0.2 part of potassium lauryl sulfate, 35 parts of styrene, 25 parts of butyl methacrylate, 10 parts of butyl acrylate, 1 part of bisphenol A dimethacrylate, and 0.5 part of t-dodecyl mercaptane with stirring at 70° C. to polymerize the mixture. The reaction solution was then neutralized with ammonia to pH 8–8.5 and passed through a filter having a 0.3 μm mesh to give a filtrate of a aqueous finely divided polymer particle solution as Emulsion B.

Emulsion C

In reactor equipped with a dropping funnel, a thermometer, a water cooling reflux conderser and a stirrer, 100 parts of ion-exchanged water was charged, and 0.2 part of potassium persulfate as a polymerization initiator was added with stirring under nitrogen atmosphere at 70° C. A monomer solution of 0.05 part of sodium lauryl sulfate, 15 parts of styrene, 6 parts of benzyl methacrylate, 10 parts of butyl methacrylate and 0.02 part of t-dodecyl mercaptane in 7 parts of ion-exchanged water was added dropwise at 70° C. to start the reaction for preparing a primary product. Two parts of a 10% ammonium persulfate solution was added to the primary product, followed by a reaction solution comprising 30 parts of ion-exchanged water, 0.2 part of potassium lauryl sulfate, 30 parts of styrene, 15 parts of butyl methacrylate, 10 parts of acrylic acid, 1 part of triethanol-propane trimethacrylate, 1 part of 1,6-hexanediol dimethacrylate, and 0.5 part of t-dodecyl mercaptan with stirring at 70° C. to polymerize the mixture. The reaction solution was then neutralized with ammonia to pH 8–8.5 and passed through a filter having a 0.3 μm mesh to give a filtrate of a aqueous finely divided polymer particle solution as Emulsion C.

Emulsion D

In reactor equipped with a dropping funnel, a thermometer, a water cooling reflux conderser and a stirrer, 100 parts of ion-exchanged water was charged, and 0.2 part of potassium persulfate as a polymerization initiator was added with stirring under nitrogen atmosphere at 70° C. A monomer solution of 0.05 part of sodium lauryl sulfate, 15 parts of styrene, 15 parts of butyl methacrylate, and 0.02 part of t-dodecyl mercaptane in 7 parts of ion-exchanged water was added dropwise at 70° C. to start the reaction for preparing a primary product. Two parts of a 10% ammonium persulfate solution was added to the primary product, followed by a reaction solution comprising 30 parts of ion-exchanged water, 0.2 part of potassium lauryl sulfate, 30 parts of styrene, 15 parts of butyl methacrylate, 1 part of dipentaerythritol hexamethacrylate, and 0.6 part of t-dodecyl mercaptane with stirring at 70° C. to polymerize the mixture. The reaction solution was then neutralized with ammonia to pH 8–8.5 and passed through a filter having a 0.3 μm mesh to give a filtrate of a aqueous finely divided polymer particle solution as Emulsion D.

In the following examples, water-soluble pigments 1 to 4 are Microjet CW2 manufactured by Orient Chemical Industries, Ltd., and water-soluble pigments 5 to 8 are Microjet CW1 manufactured by Orient Chemical Industries, Ltd.

In Examples 1 to 8, water-soluble pigments 1 to 8 are water-soluble pigments having different average particle diameters, and the average particle diameter is expressed in parentheses (unit: nm).

Abbreviations used in the following examples are as follows.

PGmBE: propylene glycol mono-n-butyl ether
DEGmBE: diethylene glycol mono-n-butyl ether
DPGmBE: dipropylene glycol mono-n-butyl ether
TEGmBE: triethylene glycol mono-n-butyl ether
PGmME: propylene glycol monomethyl ether
DMI: 1,3-dimethyl-2-imidazolidinone
DPGmME: dipropylene glycol monomethyl ether
MPD: 2-methyl-2,4-pentanediol
DEGmtBE: diethylene glycol-mono-t-butyl ether
TEGmME: triethylene glycol monomethyl ether Proxel XL-2, as a corrosion preventive for an ink, in an amount of 0.1 to 1% and benzotriazole, as a corrosion preventive for an ink jet head member, in an amount of 0.001 to 0.05% were added to water as the balance.

|  | Amount (wt %) |
| --- | --- |
| Example 1 | |
| Water-soluble pigment 1 (145) | 8.0 |
| PGmBE | 5.0 |
| DEGmBE | 7.0 |
| Emulsion A | 2.0 |
| Glycerin | 6.0 |
| 1,5-Pentanediol | 5.0 |
| Surfynol 104 | 1.0 |
| Triethanolamine | 0.8 |
| Ion-exchanged water | Balance |
| Example 2 | |
| Water-soluble pigment 2 (135) | 4.5 |
| DPGmBE | 5.0 |
| TEGmBE | 10.0 |
| Dipropylene glycol | 5.0 |
| Emulsion B | 5.0 |
| Surfynol TG | 1.2 |
| Fluorosurfactant | 0.1 |
| Ion-exchanged water | Balance |
| Example 3 | |
| Water-soluble pigment 3 (120) | 5.5 |
| PGmBE | 5.0 |
| DEGmBE | 10.0 |
| Propylene glycol | 7.0 |
| Emulsion C | 3.0 |
| Triethylene glycol | 3.0 |
| 1,6-Hexanediol | 5.0 |
| Surfynol TG | 1.4 |
| Potassium hydroxide | 0.1 |
| Ion-exchanged water | Balance |
| Example 4 | |
| Water-soluble pigment 4 (155) | 7.0 |
| DEGmBE | 10.0 |
| Emulsion D | 2.5 |
| 1,6-Hexanediol | 5.0 |
| Tripropylene glycol | 2.0 |
| DMI | 2.0 |
| Surfynol 104 | 0.8 |
| Surfynol 465 | 0.4 |
| Sodium benzoate | 0.1 |
| Ion-exchanged water | Balance |

-continued

| | Amount (wt %) |
|---|---|
| Example 5 | |
| Water-soluble pigment 5 (65) | 8.0 |
| PGmBE | 5.0 |
| DPGmME | 10.0 |
| Emulsion A | 2.5 |
| Emulsion D | 2.5 |
| MPD | 3.0 |
| Trimethylolpropane | 3.0 |
| Surfynol TG | 1.2 |
| Triethanolamine | 0.9 |
| Ion-exchanged water | Balance |
| Example 6 | |
| Water-soluble pigment 6 (60) | 5.0 |
| DPGmBE | 2.0 |
| DEGmBE | 10.0 |
| Emulsion B | 2.0 |
| Emulsion D | 3.5 |
| Neopentyl glycol | 5.0 |
| Surfynol TG | 0.5 |
| Surfynol 104 | 0.5 |
| Ion-exchanged water | Balance |
| Example 7 | |
| Water-soluble pigment 7 (50) | 6.5 |
| TEGmBE | 10.0 |
| Emulsion A | 2.5 |
| Emulsion B | 2.5 |
| Glycerin | 5.0 |
| Trimethylolpropane | 5.0 |
| Trimethylolethane | 5.0 |
| Surfynol 465 | 1.0 |
| Surfynol TG | 0.6 |
| Triethanolamine | 0.9 |
| Ion-exchanged water | Balance |
| Example 8 | |
| Water-soluble pigment 8 (55) | 5.5 |
| DPGmBE | 5.0 |
| DEGmtBE | 5.0 |
| DEGmBE | 5.0 |
| Emulsion B | 3.5 |
| Emulsion C | 0.5 |
| Diethylene glycol | 5.0 |
| Tetrapropylene glycol | 5.0 |
| Surfynol 104 | 1.0 |

Ion-exchanged water Balance

In the following comparative examples, pigment dispersants 1 to 3 used were dispersions of carbon black having an average particle diameter of 90 to 110 $\mu$m which had been dispersed with the aid of a random copolymer type styrene/acrylic acid dispersant. The average particle diameter of the pigment was as indicated in parentheses.

Comparative Example 1

Pigment dispersion 1 (90) 5.0

TEGmME 10.0

Ethylene glycol 8.0

Dispersant 3.0

DEGmME 7.0

Ion-exchanged water Balance

Comparative Example 2

Pigment dispersion 2 (120) 5.5

Glycerin 10.0

Diethylene glycol 10.0

2-Pyrrolidone 5.0

Dispersant 3.5

Ion-exchanged water Balance

Comparative Example 3

Pigment dispersion 3 (110) 5.5

Diethylene glycol 10.0

Surfynol 465 1.0

Dispersant 2.5

Ion-exchanged water Balance

Evaluation Test

The above ink composition was filled into an ink jet printer MJ-930C manufactured by Seiko Epson Corporation, and an image was printed on recording media. The recording media used were Conqueror paper, Favorit paper, Modo Copy paper, Rapid Copy paper, EPSON EPP paper, Xerox 4024 paper, Xerox 10 paper, Neenha Bond paper, Ricopy 6200 paper, Yamayuri paper, Xerox R paper, and gloss paper 1 (pictorico recording medium prepared by coating a silica sol onto a polyester sheet), gloss paper B (a recording medium prepared by coating a resin onto a polyester sheet, this recording medium being swollen with an ink), and gloss paper C (a recording medium prepared by coating a colloidal silica having an average particle diameter of 500 nm, onto paper, using a latex as a binder).

The drying to touch and the waterfastness of the formed images were evaluated as follows.

Drying to Touch

The print after drying was rubbed with an aqueous fluorescent marker pen (yellow) (ZEBRA PEN2, manufactured by Zebra Co., Ltd.), and the smearing of the print was inspected.

The results were evaluated according to the following criteria.

A: The color was not lost by rubbing a plurality of times.

B: The color was not lost by rubbing once.

C: The color was somewhat lost by rubbing once.

NG: The color was lost by rubbing once.

Waterfastness

Pure water was dropped onto the print after drying, and after the dropping of the pure water, the trace of the water droplet was inspected.

The results were evaluated according to the following criteria.

A: No trace was observed.

B: Substantially no trace was observed.

C: Some trace was observed.

NG: Considerably clear trace was observed.

The above results are summarized in the following tables.

TABLE 1

|  | Drying to touch | | | | | | | | Waterfastness | | | | | | | |
| --- | --- | --- | --- | --- | --- | --- | --- | --- | --- | --- | --- | --- | --- | --- | --- | --- |
| Example | 1 | 2 | 3 | 4 | 5 | 6 | 7 | 8 | 1 | 2 | 3 | 4 | 5 | 6 | 7 | 8 |
| Conqueror | A | A | A | A | A | A | A | A | A | A | A | A | A | A | A | A |
| Favorit | A | A | A | A | A | A | A | A | A | A | A | A | A | A | A | A |
| Modo Copy | A | A | A | A | A | A | A | A | A | A | A | A | A | A | A | A |
| Rapid Copy | A | A | A | A | A | A | A | A | A | A | A | A | A | A | A | A |
| EPSON EPP | A | A | A | A | A | A | A | A | A | A | A | A | A | A | A | A |
| Xerox P | A | A | A | A | A | A | A | A | A | A | A | A | A | A | A | A |
| Xerox 4024 | A | A | A | A | A | A | A | A | A | A | A | A | A | A | A | A |
| Xerox 10 | A | A | A | A | A | A | A | A | A | A | A | A | A | A | A | A |
| Neenha Bond | A | A | A | A | A | A | A | A | A | A | A | A | A | A | A | A |
| Ricopy 6200 | A | A | A | A | A | A | A | A | A | A | A | A | A | A | A | A |
| Yamayuri | A | A | A | A | A | A | A | A | A | A | A | A | A | A | A | A |
| Xerox R | A | A | A | A | A | A | A | A | A | A | A | A | A | A | A | A |
| Gloss paper A | B | B | B | B | B | B | B | B | B | B | B | B | B | B | B | B |
| Gloss paper B | B | B | B | B | B | B | B | B | B | B | B | B | B | B | B | B |
| Gloss paper C | B | B | B | B | B | B | B | B | A | A | A | A | A | A | A | A |

| Comparative | Drying to touch | | | Waterfastness | | |
| --- | --- | --- | --- | --- | --- | --- |
| Example | 1 | 2 | 3 | 1 | 2 | 3 |
| Conqueror | C | C | C | B | B | B |
| Favorit | C | C | C | B | B | B |
| Modo Copy | C | C | C | B | B | B |
| Rapid Copy | C | C | C | B | B | B |
| EPSON EPP | C | C | C | B | B | B |
| Xerox P | C | C | C | B | B | B |
| Xerox 4024 | C | C | C | B | B | B |
| Xerox IO | C | C | C | B | B | B |
| Neenha Bond | C | C | C | B | B | B |
| Ricopy 6200 | C | C | C | B | B | B |
| Yamayuri | C | C | C | B | B | B |
| Xerox R | C | C | C | B | B | B |
| Gloss paper A | NG | NG | NG | NG | NG | NG |
| Gloss paper B | NG | NG | NG | NG | NG | NG |
| Gloss paper C | NG | NG | NG | C | C | C |

What is claimed is:

1. An ink composition comprising a pigment, a glycol ether, a water-soluble emulsion, and water, the pigment being dispersible and/or soluble in water without a dispersant, the glycol ether being one member or a mixture of at least two members selected from a group consisting of diethylene glycol mono-n-butyl ether, triethylene glycol mono-n-butyl ether, propylene glycol mono-n-butyl ether, and dipropylene glycol mono-n-butyl ether.

2. The ink composition according to claim 1, wherein the content of the water-soluble emulsion in the ink composition is 0.5 to 10% by weight.

3. The ink composition according to claim 1, wherein the surface of the pigment has at least one functional group, selected from carbonyl, carboxyl, hydroxyl, and sulfone groups, or a salt thereof on the surface, thereby permitting the pigment to be dispersible and/or soluble in water without a dispersant.

4. The ink composition according to claim 1, wherein the content of the pigment in the ink composition is 2 to 15% by weight.

5. The ink composition according to claim 1, wherein the content of the glycol ether in the ink composition is 3 to 30% by weight.

6. The ink composition according to claim 1, which further comprises an acetylene glycol surfactant.

7. The ink composition according to claim 6, wherein the content of the acetylene glycol surfactant in the ink composition is 0.1 to 5% by weight.

8. The ink composition according to claim 1, which further comprises a glycol.

9. The ink composition according to claim 8, wherein the content of the glycol in the ink composition is 3 to 25% by weight.

10. A recording method comprising the step of depositing an ink composition onto a recording medium to perform printing, wherein the ink composition is one according to claim 1.

11. An ink jet recording method comprising the step of: ejecting a droplet of an ink composition; and depositing the droplet onto a recording medium to perform printing, wherein the ink composition is one according to claim 1.

12. The method according to claim 10, wherein the recording medium is plain paper, recycled paper, or a recording medium having a gloss layer.

13. A recorded medium obtained by the ink jet recording method according to claim 10.

14. An ink composition according to claim 1, wherein the water is present as the major component.

15. An ink composition according to claim 14, wherein the water is present in an amount of at least 60% by weight.

16. An ink composition according to claim 14, wherein the pigment is present in the ink composition in an amount of 2–15% by weight.

17. An ink composition according to claim 16, wherein the glycol ether is present in the ink composition in an amount of 3–30% by weight.

18. An ink composition according to claim 17, wherein the water-soluble emulsion is present in the composition in an amount of 0.5–10% by weight.

19. An ink composition according to claim 18, wherein the surface of the pigment has at least one functional group, selected from carbonyl, carboxyl, hydroxyl, and sulfone groups, or a salt thereof on the surface, thereby permitting the pigment to be dispersible and/or soluble in water without a dispersant.

* * * * *